T. J. CAMPBELL.
STOOKING ATTACHMENT FOR BINDERS.
APPLICATION FILED JULY 14, 1917.
1,264,154.
Patented Apr. 30, 1918.
9 SHEETS—SHEET 1.
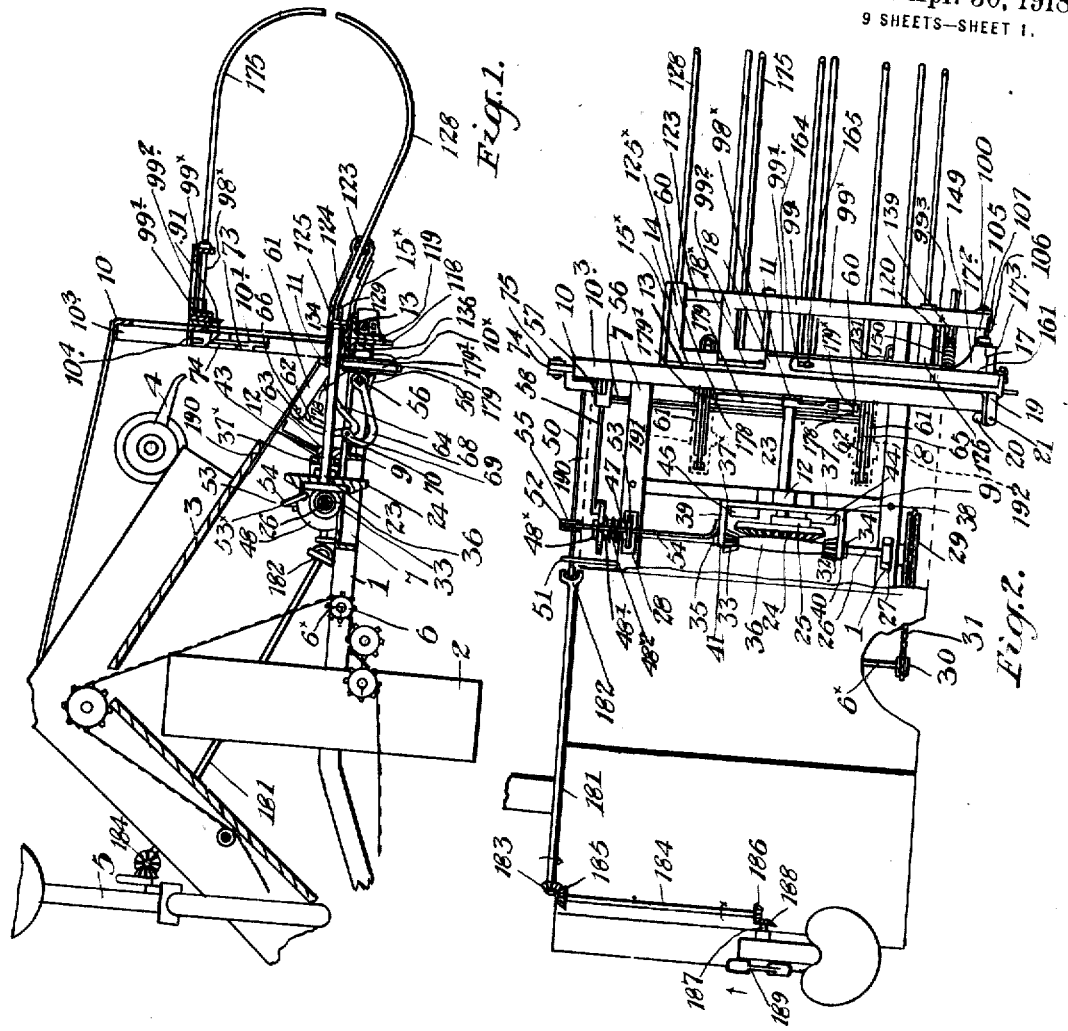
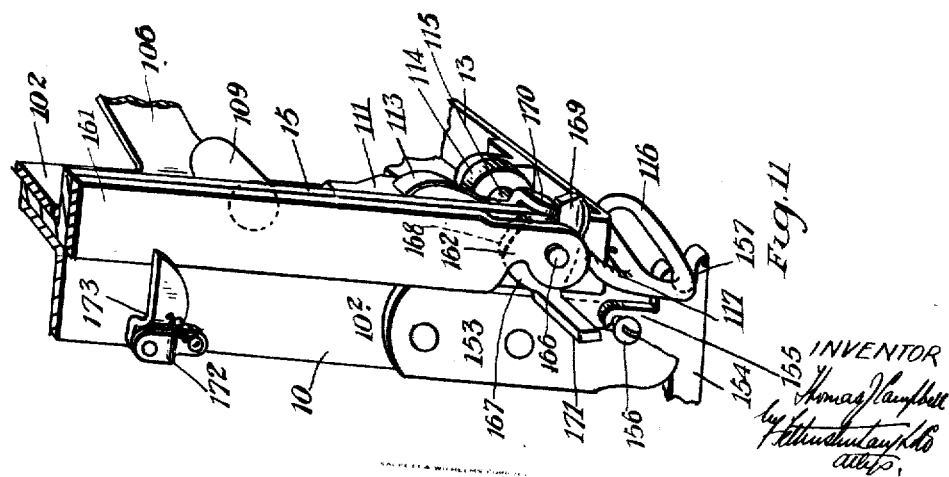
INVENTOR
Thomas J Campbell

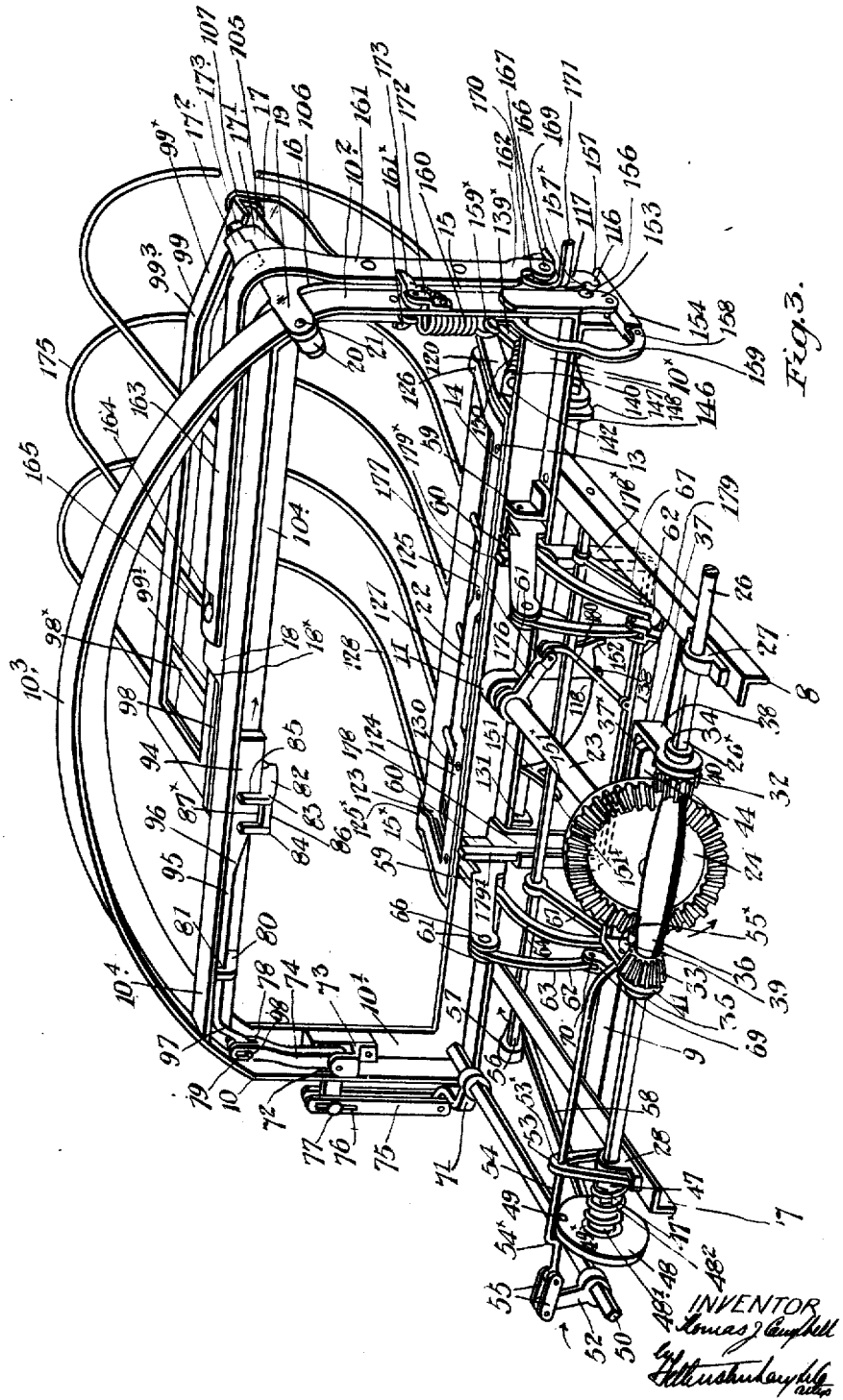

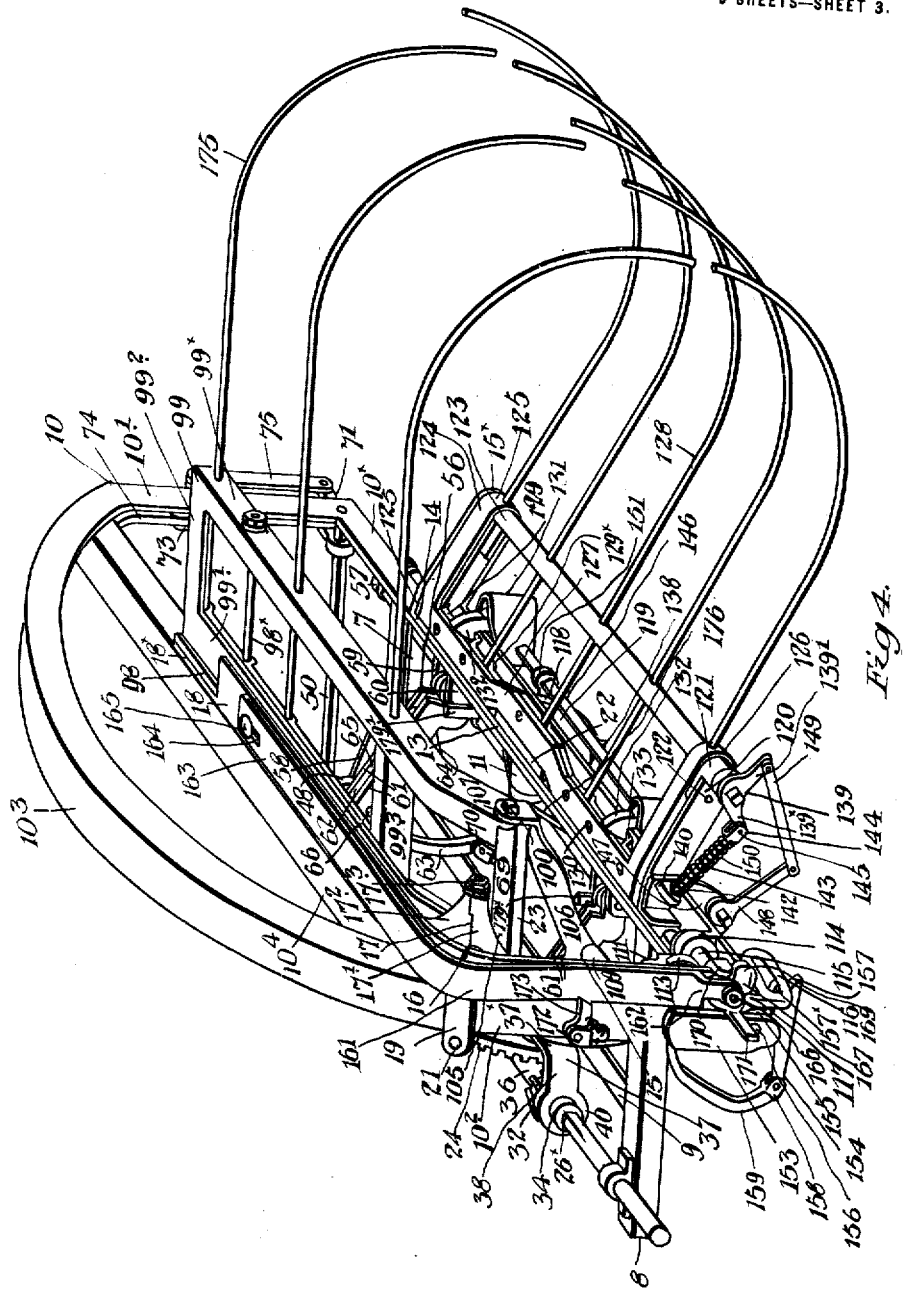

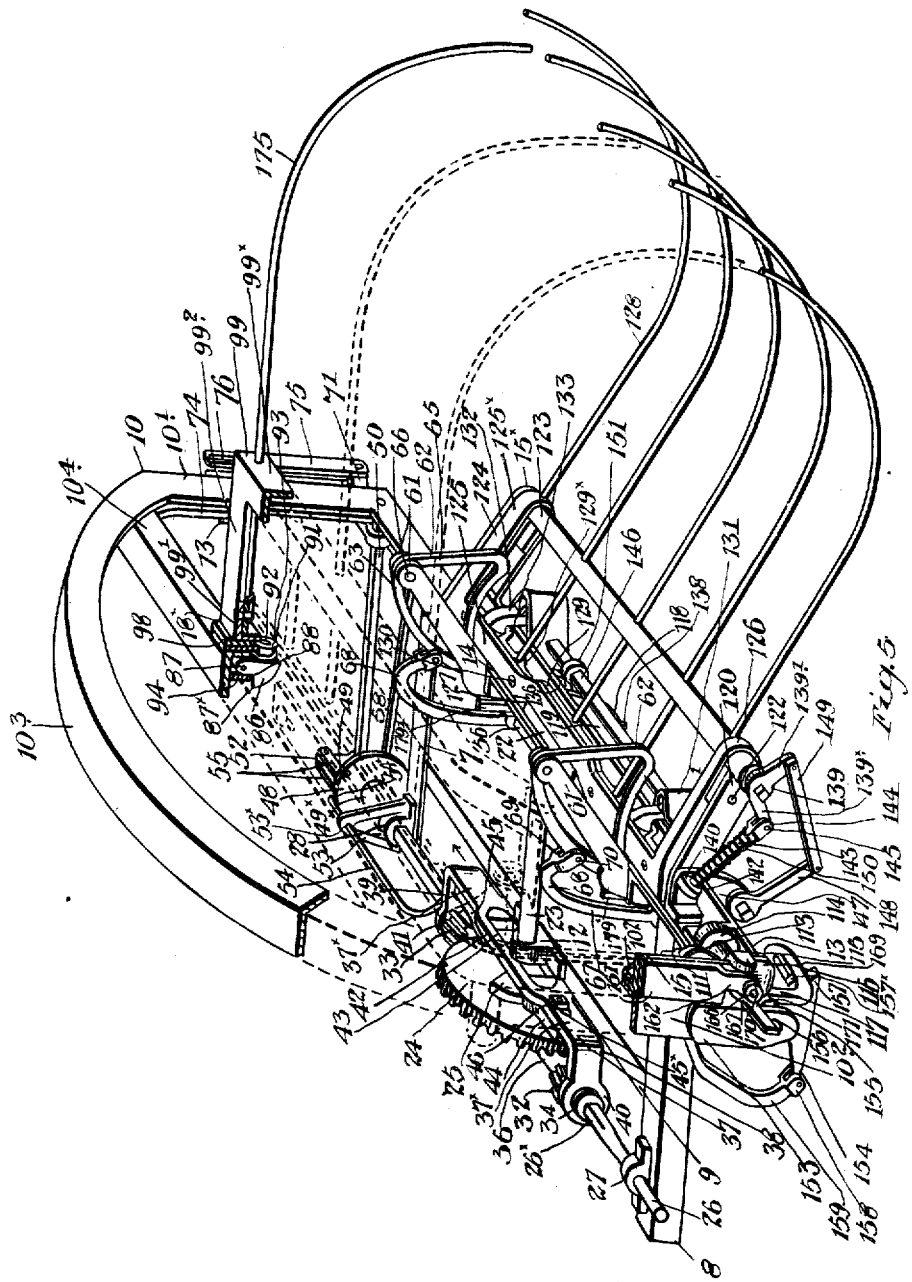

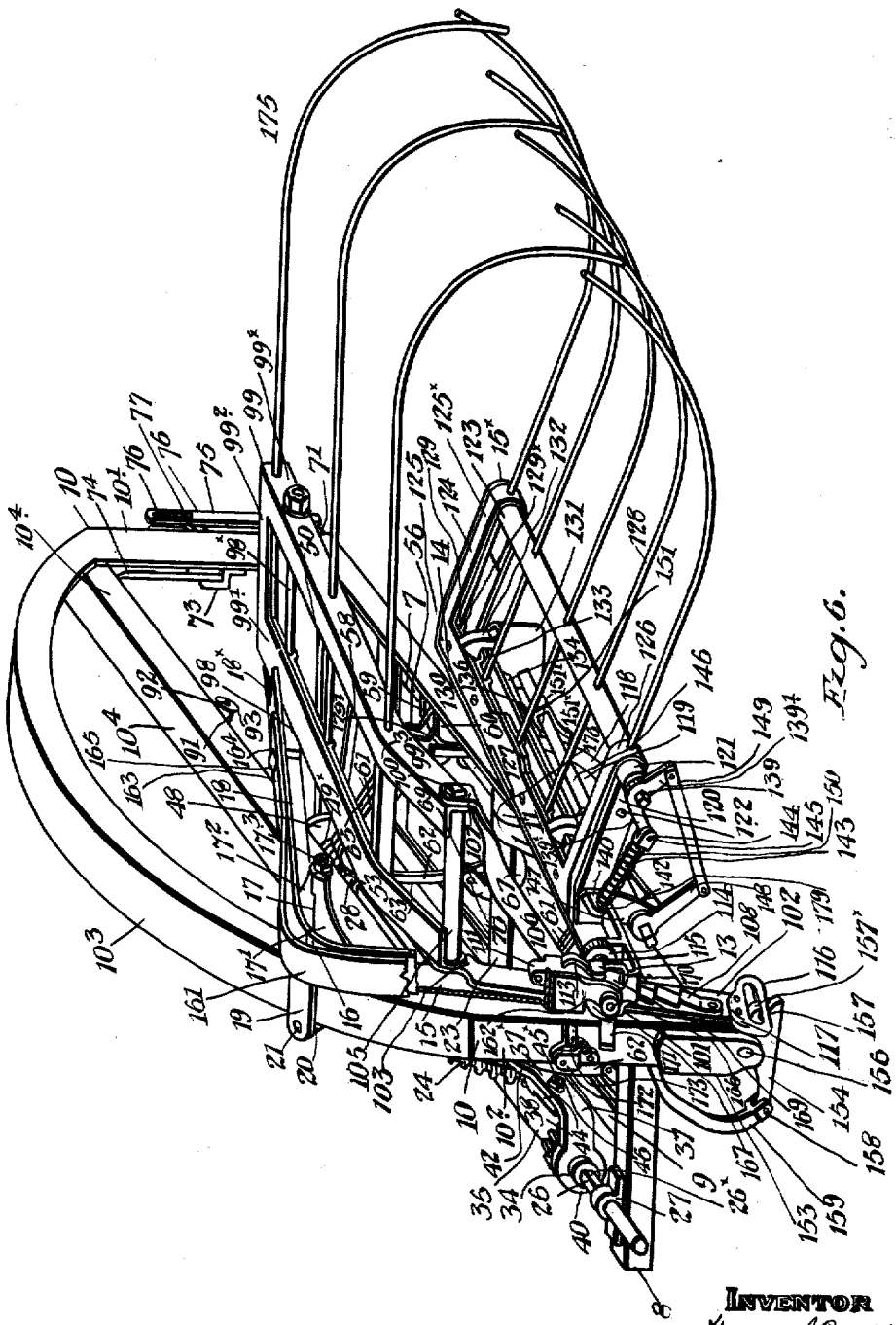

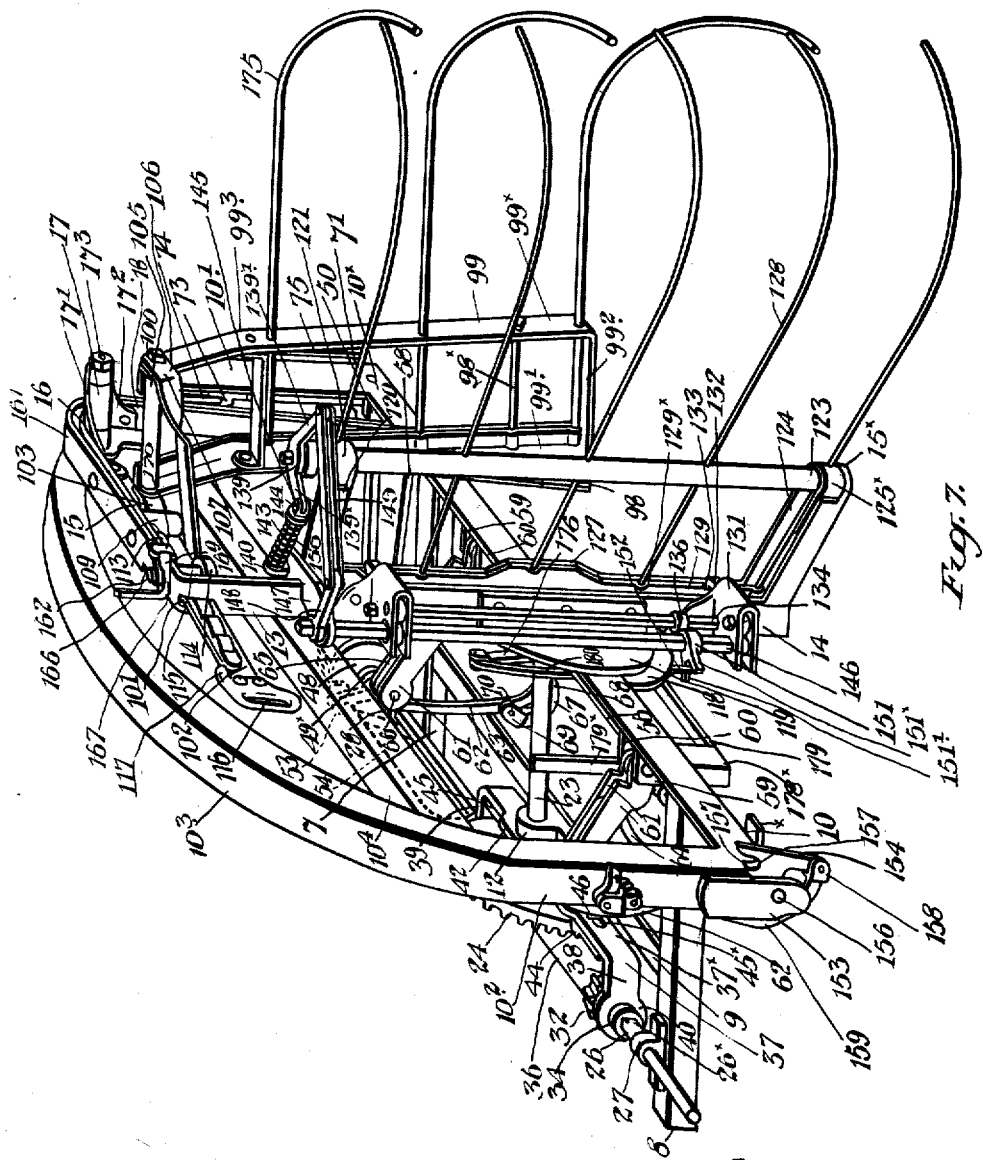

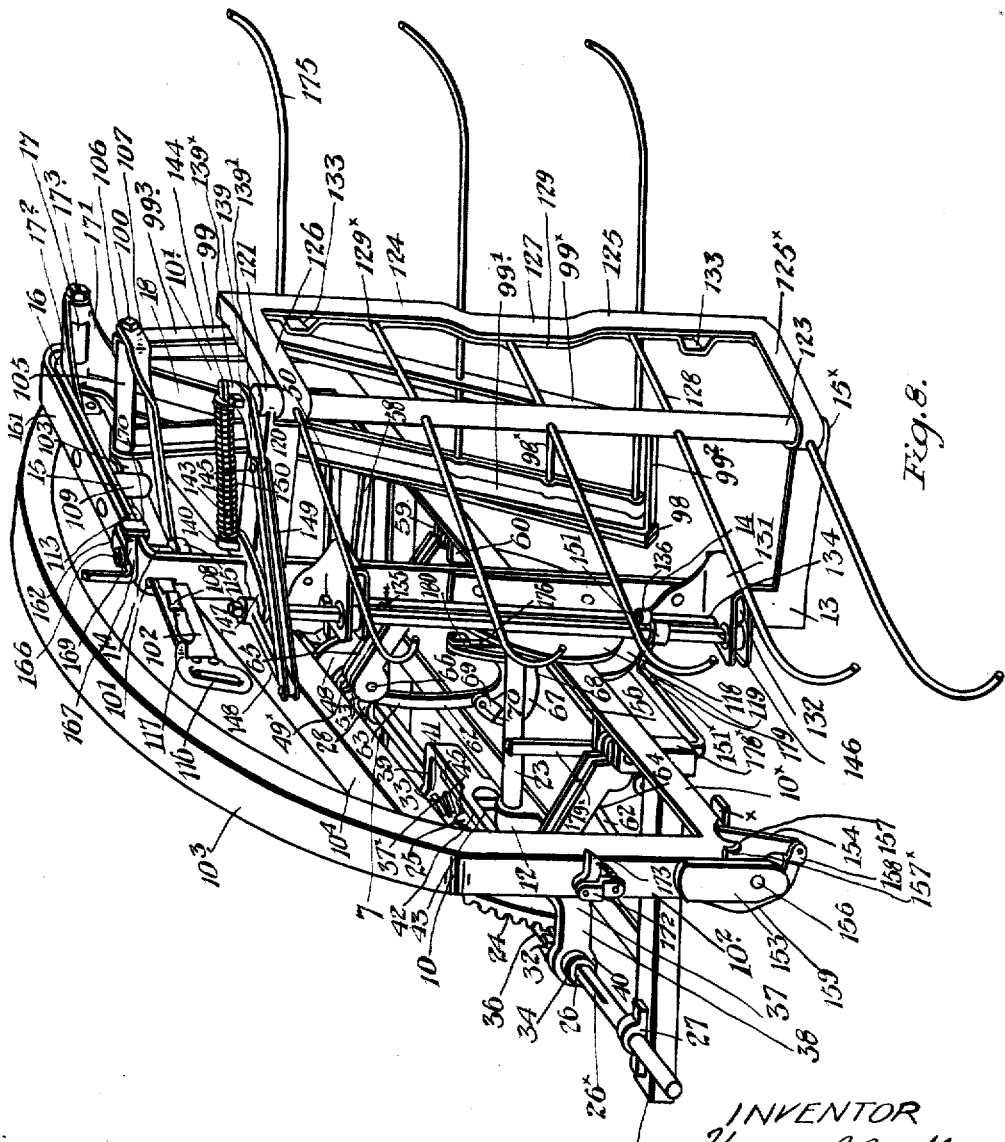

T. J. CAMPBELL.
STOOKING ATTACHMENT FOR BINDERS.
APPLICATION FILED JULY 14, 1917.

1,264,154.

Patented Apr. 30, 1918.
9 SHEETS—SHEET 8.

T. J. CAMPBELL.
STOOKING ATTACHMENT FOR BINDERS.
APPLICATION FILED JULY 14, 1917.
1,264,154.
Patented Apr. 30, 1918.
9 SHEETS—SHEET 9.
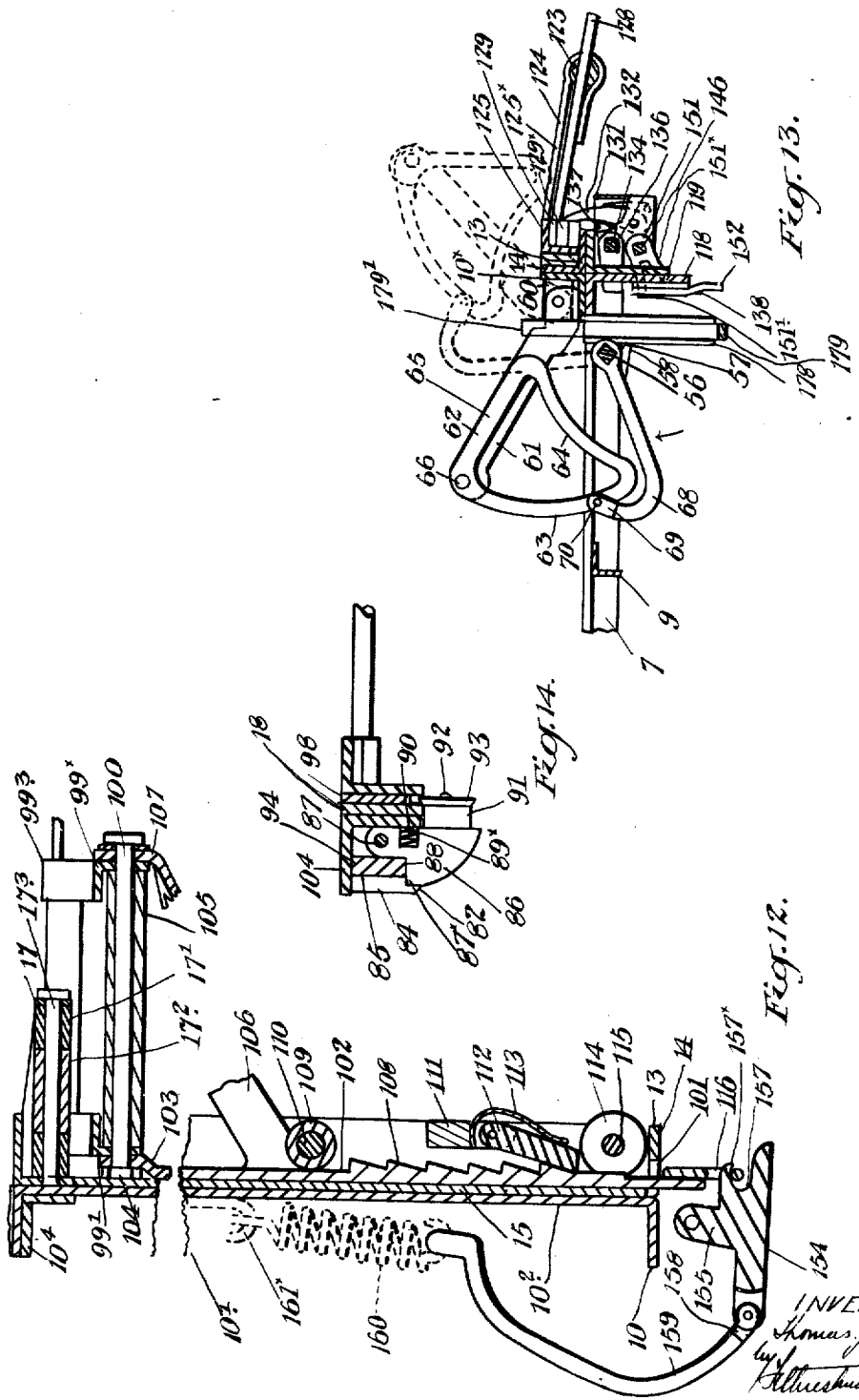

UNITED STATES PATENT OFFICE.

THOMAS JAMES CAMPBELL, OF MOOSE JAW, SASKATCHEWAN, CANADA.

STOOKING ATTACHMENT FOR BINDERS.

1,264,154.  Specification of Letters Patent.  Patented Apr. 30, 1918.

Application filed July 14, 1917. Serial No. 180,651.

*To all whom it may concern:*

Be it known that I, THOMAS JAMES CAMPBELL, of the city of Moose Jaw, in the Province of Saskatchewan, Canada, have invented certain new and useful Improvements in Stooking Attachments for Binders, of which the following is the specification.

My invention relates to improvements in stooking attachments for binders and the object of the invention is to devise a light, simple, compact machine which may be readily attached to or carried by a binder and it consists essentially of the following arrangement and construction of parts as hereinafter more particularly explained.

Figure 1, is a sectional side elevation of a portion of a binder showing my device attached thereto.

Fig. 2, is a plan view of the parts shown in Fig. 1.

Fig. 3, is an enlarged perspective detail of the major portion of my stooking attachment showing the parts in the normal position.

Fig. 4, is a similar view to Fig. 3 looking at the opposite side of the machine.

Fig. 5, is a similar view to Fig. 4 showing the main frame broken away and the parts in the position they assume when packing sheaves.

Fig. 6, is a similar view to Fig. 4 showing the parts in the position they assume during the compression of a shock.

Fig. 7, is a similar view to Figs. 4 and 6 showing the parts in the position they assume when the shock is upended ready to deliver.

Fig. 8, is a similar view to Fig. 7, showing the parts in the position they assume after the upending and delivery of a shock.

Fig. 11, is an enlarged perspective detail of the mechanism whereby the compressing mechanism is drawn into the compressing position.

Fig. 12, is an enlarged sectional detail through the mechanism on $x$—$y$ Fig. 9, and also showing the means whereby the compressing arms are pivotally connected to the main frame.

Fig. 13, is a sectional detail showing the packing members, the normal position of the packing members being shown in full lines and the packing position of the packing members by dotted lines.

Fig. 14, is a sectional detail of the means for holding the compressor members in the normal or receiving position.

In the drawings like letters of reference indicate corresponding parts in the various figures.

Figure 9:
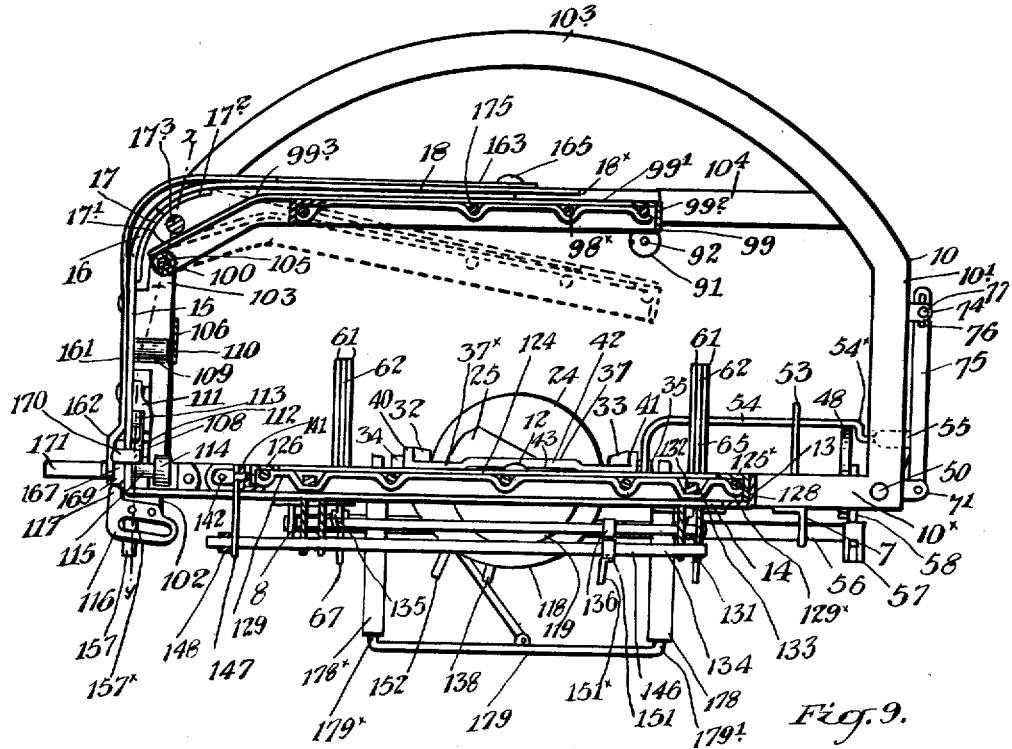
Fig. 9, is a cross sectional view taken adjacent to the compressing mechanism showing the parts in the normal position in full lines and in the initial compressing position by dotted lines.

1 indicates the main frame of a binder, such binder being provided with the usual carrying wheel 2, delivery deck 3, discharge fingers 4, seat support and seat 5 and driving mechanism 6. 7 and 8 indicate angle bars extending outwardly from the main frame beneath the discharge end of the deck 3. 9 indicates an angle bar connecting the bars 7 and 8 together intermediately of their length.

10 indicates a frame preferably formed of angle iron, the portions $10^x$, $10'$ and $10^2$ forming three sides of a rectangle and the arc-shaped top portion $10^3$, which is provided for a purpose which will hereinafter appear. $10^4$ indicates an angle bar extending horizontally across the frame 10 slightly above the vertical ends $10'$ and $10^2$. The lower bar $10^x$ of the frame 10 is secured to the ends of the bars 7 and 8. 11 indicates a bearing carried by the bar portion $10^x$ intermediately of its length. 12 indicates a bearing carried by the bar 9 intermediately of its length and in alinement with the bearing 11.

13 indicates the tilting frame, which comprises an angle bar portion 14 set parallel and in contact with the outer face of the bar portion $10^x$. One end of the bar 14 is provided with an upwardly extending portion 15, which is adjacent to the vertical portion $10^2$ of the frame 10. The upper end of the portion 15 is curved slightly at 16. The opposite end of the angle bar portion 14 of the tilting frame 13, approaching the vertical portion $10'$ of the main frame 10 is provided with an outwardly extending arm portion $15^x$. 17 indicates a hinge comprising two portions 17' secured to the upright portion 15 and the portion 17² connected to the portion 17' by a hinge bolt 17³. 18 indicates an upper horizontal portion of the swinging frame 13, such portion being connected to the hinge portion 17² thereby having a hinged connection to the upright portion 15 of the tilting frame.

19 indicates a lug, which forms part of the hinge member 17' and extends inwardly from such member over the peripheral face of the arc-shaped portion 10³ of the main frame 10.

20 indicates a roller journaled on the bearing pin 21 carried by the lug 19. The roller 20 bears against the inner edge of the arc-shaped portion 10⁸ of the frame 10 for a purpose which will hereinafter appear.

22 indicates a plate, which is secured to the vertical flange of the angle bar portion 14 of the frame 13. 23 indicates a shaft journaled in the bearings 11 and 12 and extending at its outer end through the vertical flange of the bar portion 10ˣ of the main frame 10 and through the vertical flange of the bar portion 14 of the tilting frame 13, being secured at its extreme end to the plate 22. On the opposite or inner end of the shaft 23 is secured a bevel gear 24.

25 indicates a cam plate secured to the inner face of the gear 24. 26 indicates a shaft journaled in bearings 27 and 28 carried respectively by the angle bars 7 and 8. 29 indicates a sprocket gear secured to one end of the shaft 26 at the outside of the angle bar 8. 30 indicates a sprocket pinion mounted upon the shaft 6ˣ forming part of the driving mechanism of the binder. 31 indicates a sprocket chain connecting the sprocket pinion 30 and sprocket gear 29 together. The central portion of the shaft 26 between the bearings 27 and 28 is squared as indicated at 26ˣ. 32 and 33 indicate bevel pinions provided with hubs 34 and 35 having squared orifices through which the squared portion 26ˣ of the shaft 26 extends. The pinions 32 and 33 are designed to be brought alternately into engagement with the bevel gear 24.

36 indicates a spacing sleeve mounted upon the shaft 26 and extending between the pinions 32 and 33. 37 indicates a movable bracket member provided with arms 38 and 39 having annular ends 40 and 41 into which the hubs 34 and 35 of the gears 32 and 33 turnably fit. The main portion 37ˣ of the bracket member 37 is provided with an enlarged central portion 42 having a longitudinal slot 43 formed therein and through which the shaft 23 extends. 44 and 45 indicate stationary cam members secured to the portion 37ˣ of the bracket member 37 at each end of the slot 43. The portion 37ˣ may be provided with supplemental slots 45ˣ through which the securing bolts 46 of the stationary cams 44 and 45 extend so that the cams 44 and 45 may be adjustably secured in position when desired.

It will be understood that the shaft 26 is continuously driven from the binder.

47 indicates a clutch member secured to the shaft 26 to the outside of the bearing 28 and provided with a ratchet face 47ˣ. 48 indicates a disk, which is freely mounted upon the round end of the shaft 26, such end being provided with an enlargement 48ˣ by which the disk is held thereon. The disk 48 is provided with a notch 49 in its periphery. The disk 48 is provided with a hub 48' provided with a ratchet face 48² designed to be carried into engagement with the ratchet face 47ˣ. 49ˣ indicates a compression spring extending between the disk 48 and the bearing 28.

50 indicates a rectangular shaft turnably mounted at one end in a vertical flange 10ˣ of the frame 10 and at its opposite end in a bracket 51 extending from the inner end of the angle bar 7. 52 indicates a crank arm mounted upon the bar 50. 53 indicates a standard bracket extending upwardly from the bearing bracket 28 and provided with a bearing orifice 53ˣ. 54 indicates a rod extending through the orifice 53ˣ and over the disk 48 adjacent to its periphery. To the outside of the disk 48 the rod 54 is provided with a depressed portion 54ˣ forming a shoulder designed to be brought into engagement with the outer face of the disk 48.

55 indicates a pair of links connecting the outer end of the rod 54 with the upper end of the crank 52. 56 indicates a rod turnably mounted in the vertical flanges of the bars 7 and 8. 57 indicates a crank arm secured to the rod 56 and 58 indicates a pitman pivotally connected at one end to the disk 48 and at the opposite end to the lower end of the crank arm 57. 59 and 60 indicate bearing brackets secured to the horizontal portion 10ˣ of the frame 10, a pair of brackets 59 and 60 being located at each side of the shaft 23. 61 indicates a double arm pivotally mounted between the brackets 59 and 60. 62 indicates a substantially triangular member, the side 63 of such member being curved outwardly in arc-shaped form and the side 64 of such member being curved inwardly in arc-shaped form. Through that portion of the triangle forming the apex produced by the converging sides 63 and 65 extends a pivot pin 66 pivotally mounting such member between the members of the double arm 61. Normally the side 65 of the triangular member lies between the members of the double arm 61, the sides 62 and 64 depending downwardly therefrom. 67 indicates an arm secured to the shaft 56 and extending downwardly in an inclined direction and provided at its lower end with an upwardly curved portion 68 terminating in a jaw portion 69 extending at each side of the portion 68 of the triangular member 62, being pivotally connected thereto by a pin 70.

71 indicates a crank arm secured to the shaft 50 in proximity to the main frame 10. 72 indicates a vertical slot formed in the inwardly extending flange of the vertical angle bar portion 10'. 73 indicates a bearing bracket secured to the vertical portion 10' and in which is pivotally mounted a bell crank 74, the lower horizontal arm of which extends through the slot 72. 75 indicate links pivotally connected at their lower ends to the crank arms 71 and provided at their upper ends with longitudinal slots 76. 77 indicates a pin extending through the slot 76 and through the horizontal arm of the bell crank 74. The vertical arm of the bell crank 74 is slightly offset inwardly intermediately of its length and provided at its upper end with a jaw 78, the jaw member being provided with longitudinal slots 79.

80 indicates a bracket extending from the depending flange of the bar member 10⁴ and provided with a rectangular orifice 81. 82 indicates a bracket also secured to the depending flange of the bar 10⁴, such bracket comprising two arms 83 and 84 each having open ended slots 85. 86 indicates a swinging member mounted upon the pin 87 extending through the side members of the brackets 84 and 85. The swinging member 86 is provided with an outward extension 87ˣ forming a shoulder 88. 89 indicates a recess formed in the opposite face of the swinging member and in which is located a compression spring 90 bearing against the inner face of the depending flange of the bar 10⁴. The swinging member 86 depends below the vertical flange of the bar 10⁴, such depending portion being provided with an outwardly extending pin 92 on which is journaled a roller 91, the outer edge of the roller being provided with a flange 93. 94 indicates a slide member slidably held in the open ended slot 85 so that the lower edge thereof normally bears against the shoulder 88 of the swinging member 86, the upper edge bearing against the horizontal flange of the bar member 10⁴. The sliding member 94 is provided with a stem 95 extending through the orifice 81 of the bracket 80. 96 indicates an inclined portion merging the lower portion of the stem 95 into the lower edge of the sliding member 94. The upper end of the stem 95 is provided with a down-turned portion 97 extending into the jaw 78 of the bell crank 74. 98 indicates a pin extending through the lower end of such downturned portion and through the slots 79 of the jaw 78.

When the parts are in their normal position the lower edge of the upper horizontal portion of the swinging frame 18 rests upon the roller 91 as clearly indicated in Fig. 14 of the drawings. The extreme outer end of the horizontal flange of the extension 18 is cut away at 18ˣ.

98 indicates a filling piece secured to that portion of the vertical flange of the angle bar 18 corresponding to the cut-away portion 18ˣ of the horizontal flange.

99 indicates the compressor frame, which is formed of angle bar, the outer and inner members 99ˣ and 99' being connected together at one end by a cross bar portion 99². The opposite ends of the portions 99ˣ and 99' are depressed downwardly at 99³ in an inclined direction, the depending flanges thereof being pivotally mounted upon the pivot bolt 100. 98ˣ indicates a bolt which extends through the filling piece 98 and is secured in the depending flange of the upper extension 18 of the swinging frame. The bolt 98ˣ extends outwardly and through the depending flanges of the compressor member 99 thereby swingably connecting the compressor member to the upper member 18 of the tilting frame.

The swinging frame 14 is provided with a slot 101. 102 indicates a bar extending through the slot 101 and swung at its upper end upon the bolt 100, the upper end of the bar 102 being slightly offset at 103 to provide room for the head 104 of the bolt 100. 105 indicates a spacing sleeve mounted upon the bolt 100 and extending between the bar members 99ˣ and 99'. The bar 102 is provided with an arm 106 extending outwardly therefrom and provided with a vertically set end 107 through which the opposite end of the bolt 100 extends thereby forming a bearing for each end of the bolt 100. 108 indicates a ratchet rack formed integral with the bar 102. 109 indicates a roller mounted upon a pin 110 extending from the vertical portion 15 of the frame 14, the periphery of the roller bearing against the face of the bar 102. 111 indicates a bracket also carried by the vertical portion 15 and in which is pivotally mounted a dog 112 coacting with the ratchet rack 108, the dog 112 being held in engagement with the rack by a spring 113. 114 indicates a roller mounted upon a pin 115 extending from the vertical portion 15 of the frame 14 in proximity to the lower end of such portion and bearing against the bar 102 at the inside of the rack 108. 116 indicates a loop member secured to the lower end of the bar 102, the loop being in the form of a substantially oblong slot set at a downward incline as clearly shown in Fig. 9. The member 116 is also provided with an upwardly extending tongue portion 117 for a purpose which will hereinafter appear.

118 indicates an arc-shaped plate secured to the horizontal flange of the lower bar portion 10ˣ of the main frame 10 centrally beneath the end of the shaft 23. 119 indicates an arc-shaped plate carried by the tilting frame 13 in the same relative position to the shaft 23 as the plate 118, the opposing face plates 118 and 119 bearing together as the shaft 23 is turned so as to carry the tilting frame to the tilting position.

120 indicates an arm which is secured to the angle bar portion 14 of the tilting frame 13 in proximity to the vertical portion 15 of 13 in the tilting frame. The arm 120 inclines such downwardly to correspond to the downward incline of the arm 15× and is provided at its lower end with a bearing member 121, which is secured to the arm 120 by a bolt 122. 123 indicates a rock shaft journaled in the bearing member 121 and the arm 15×. 124 indicates the inner portion of the tilting frame 13. Such inner portion comprises an angle bar portion 125 paralleling the bar portion 14 and at its ends with arms 125× and 126 paralleling respectively the arms 15× and 120. The outer ends of the arms 125× and 126 are secured to the rocking shaft 123. The central portion of the bar portion 125 is provided with an offset 127 so as to provide space for the plate 122 hereinbefore described.

128 indicate a series of tines having upwardly curved lower ends. The tines 128 extend through the rocking shaft 123 to beneath the horizontal flange of the bar portion 125. 129 indicates a bar corresponding generally in form to the upper flange of the bar portion 125 and fitting against the lower face of such flange. The bar 129 is provided with recess portions 129× into which the upper ends of the tines 128 extend and in which they are clamped, the bar 129 being secured to the flange of the bar 125 by suitable screws 130. By this means it will be seen that the inner frame 125 and the tines 128 carried thereby are hingedly connected to the arms 125× and 126 of the tilting frame.

In order to lock the inner frame in position within the tilting frame I have provided the following mechanism:

131 indicate brackets carried by the tilting frame 13 and in which are swingably mounted spring held locking dogs 132. 133 indicate depressed portions formed in the bar 129 forming recesses into which the engaging ends of the locking dogs 132 enter when in the locking position thereby securing the bar of the inner frame 125 to the bar 14 of the tilting frame 13. 134 indicates a rocking shaft journaled at its ends in the brackets 131, such bar being resiliently held from turning by means of a spring 135, one end of the spring being secured to the rocking bar 134 and the opposite end to a suitable portion of the tilting frame.

136 indicates a finger, which is secured to the bar 134 in proximity to the periphery of the arc-shaped plate 118 and in such a position so that when the tilting frame is tilted such finger travels in close proximity to the edge of the plate 118 and extending at right angles across such edge. 137 indicate cams also secured to the shaft 134 and located within the brackets 131 so as to bear against the inner edge of the dogs 132 so as to operate against their spring pressure. 138 indicates a projection carried by and extending radially beyond the edge of the plate 118 and with which the finger 136 engages when the tilting frame is carried to the tilting position. When the finger 136 engages the projection 138 the rocking shaft 134 is rocked and the cam 137 carried against the dog 132 thereby forcing such dog out of engagement with the recess 133 and thereby releasing the inner frame 125 from the tilting frame.

Figure 10:
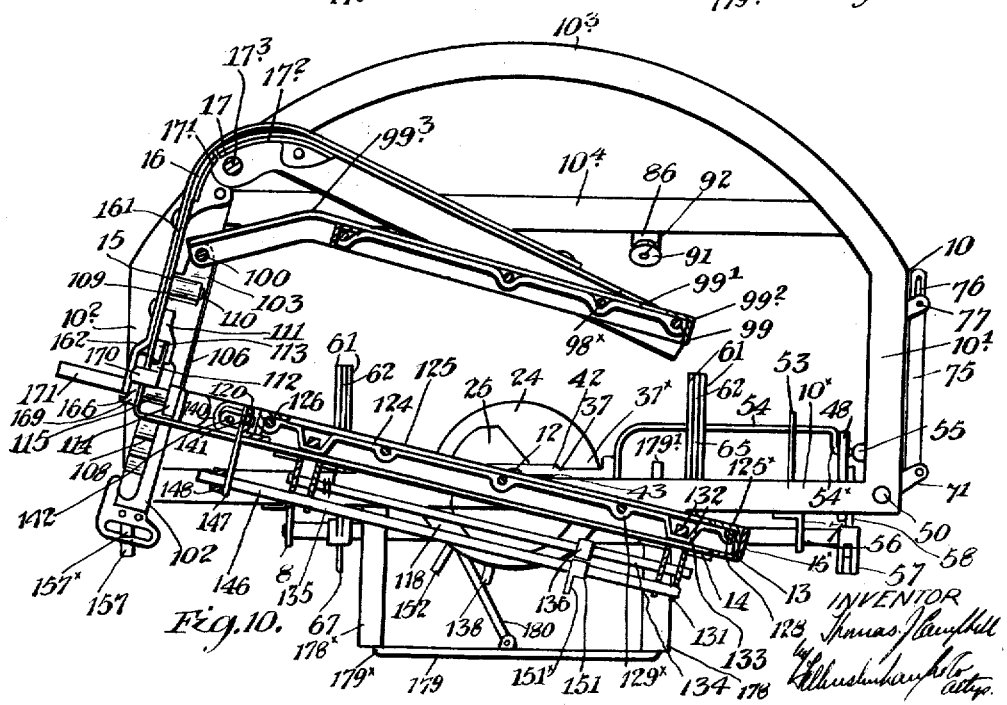
Fig. 10, is a similar view to Fig. 9 showing the parts in the position they assume during the compressing of a shock.

In order to swing the inner frame so that the tines 128 are carried inwardly toward the main frame 10 when the tilting frame is carried to the tilting position I have provided the following mechanism:

139 indicates a lever secured to the end of the rocking shaft 123. 140 indicates a lug provided with a stem 141, which is swiveled within the arm 122 (see Fig. 10). The lug 140 is provided with an orifice 142. 143 indicates a rod extending at one end through the orifice 142 and provided at its opposite end with a fork 144 into which one arm 139× of the lever 139 extends, being pivotally secured therein by a pin 145. 146 indicates a rocking rod also journaled in the brackets 131 and in a supplemental bracket plate 147 carried by the tilting frame. 148 indicates an arm carried by the end of the rocking rod 146 and adjacent to the bracket plate 147. 149 indicates a link pivotally connected at one end to the lower end of the arm 148 and at the opposite end to the arm 139' of the lever 139.

150 indicates a compression spring extending between the lug 140 and the forked end 144 and surrounding the stem 143.

In order to rock the rod 146 when the tilting frame is carried to the tilting position I have provided a fork member 151 secured to the rocking rod 146, one arm 151× of such member, when in the normal position, being shorter than the arm 151', the short arm only extending in a line with the inner face of the plate 118, the end of the long arm 151' extending past such face.

152 indicates a projection extending from the plate 118 in alinement with the projecting portion of the arm 151' and with which such projecting portion is designed to engage when the tilting frame is carried to the tilting position.

In order to hold the pivoted end of the compressor member 99 in a relative stationary position while the tilting frame by which it is carried is tilted upward I have provided the following mechanism, which co-acts with the bar 102 in order to provide the foregoing result.

153 indicates a bracket plate carried by the main frame and depending below the same. 154 indicates a swinging member provided with a lug 155, which is pivotally secured to the bracket plate 153 by a rivet or bolt 156. The outer end of the swinging member 154 is provided with a fork 157, the upper member 157$^x$ of which passes normally through the slot of the member 116, the lower member of the fork projecting beyond the upper member for a purpose which will hereinafter appear. The opposite end of the member 154 is provided with a fork 158. 159 indicates a curved link, which is connected at its lower end in the fork 158 and provided at its upper end with a hook 159 with which the lower end of the spiral spring 160 engages. The upper end of the spring 160 is connected by a hook 161$^x$ to a suitable portion of the main frame 10. It will thus be seen that when the tilting frame swings upwardly to the tilting position the bar 102 is held stationary by reason of its engagement with the fork 157 thereby holding the corresponding end of the compressor member from rising during the upward movement of the corresponding end of the tilting frame. This operation continues until the pressure on the shock is sufficient to overcome the tension of the spring 160 thereby allowing the forked end of the swinging member 134 to be swung upward and thereby freeing the tilting frame to travel to its final tilting position.

In order to lock the compressor member in the compressing position as the tilting frame is carried upward, the bar 102 being held stationary as above described, the spring dog 112 engages the teeth of the rack 108 thereby locking the compressor member in the compressed position. In order to release the compressor member after the depositing of a shock I have provided the following mechanism:

161 indicates a bar secured to the vertical portion 15 of the tilting frame, the lower end of such bar being out-turned at 162 to form a bearing lug 163. The upper end of the bar 161 is curved so as to provide a horizontal spring extension 163 provided with a longitudinal slot 164 through which a bolt 165 extends to secure the spring bar to the upper extension 18 of the tilting frame. Between the bearing lug 163 and the vertical portion 15 of the tilting frame is pivotally mounted upon a pin 166 a cam member 167, the major radius formed by the portion 168 extending upwardly in the normal position and an extension 169 extending horizontally from below the pivot point of the cam and on which a finger 170 forming part of the dog 112 rests when the parts are in their normal position. 171 indicates a finger extending outwardly from the opposite side of the cam and at right angles thereto. 172 indicates a bracket carried by the vertical portion 10$^2$ of the main frame 10 and in which is pivoted a spring held detent 173, the lower edge of which is curved upwardly and extends across the path of the finger 171 when the tilting frame is carried to the tilting position. By this means when the tilting frame is swung upward the detent 173 is carried upward by the finger 171 so as to allow the finger to pass. When, however, the movement of the tilting frame is reversed the finger 171 engages the upper end of the detent which is held rigid in its bearing bracket and, therefore, turns the cam 167 so that the major radius 168 is carried into contact with the finger 170 thereby forcing the dog 112 outwardly out of engagement with the ratchet rack 108. In order to carry the cam back to its normal position, when all the parts finally assume their normal position, the projection 117 engages the lower peripheral portion of the cam 169 thereby forcing the cam in the reverse direction back to its normal position.

175 indicates a series of upper tines, which are carried by the parallel bars 99$^x$ and 99$'$ of the compressor member 99.

In order to prevent the feeding of the sheaves from the binder deck during the upending and depositing of a shock I have provided the following mechanism.

176 indicates an arm secured to the shaft 23 and provided with a forked lower end 177. 178 and 178$^x$ indicate opposing channel members depending from the main frame 10 at each side of the shaft 23, the open sides of the channels opposing each other. 179 indicates a broad U-shaped bar member, the vertical portions 179$^x$ and 179$'$ thereof slidably fitting within the opposing channel members 178 and 178$^x$.

180 indicates a link connecting the horizontal portion of the U-shaped member 179 with the forked end 177 of the arm 176. It will thus be seen that when the shaft 23 is rocked the arm 176 is rocked in order to operate the mechanism to deposit the sheaf. The arm 176 is carried upward thereby drawing upon the link 180 and carrying the bar portions 179$^x$ and 179$'$ upward so as to form an obstruction to the passage of a sheaf from the binder deck on to the tines 128.

Referring to Figs. 1 and 2, 181 indicates an inclined shaft carried in suitable bearings carried by the binder. The lower end of the shaft 181 is connected by a universal joint connection 182 to the shaft 50. The upper end is provided with a bevel gear 183. 184 indicates a shaft extending at right angles to the shaft 181 and journaled in suitable bearings and provided at one end with a bevel gear 185 meshing with the bevel gear 183 and at the opposite end with a bevel gear 186. 187 indicates a short shaft journaled in suitable bearings in proximity to the foot board on which the seat 5 is carried. One end of the shaft 187 is provided with a bevel gear 188 meshing with the gear 186 and the opposite end with a double foot lever 189 whereby the shaft 187 may be rocked by the foot of the operator in either direction.

190 indicates a deck extension extending from the deck of the binder and over my mechanism into proximity to the main frame 10, the deck extension being provided with slots 191 and 192 indicated by dotted lines in Fig. 2, through which the packer members 61 pass when packing the sheaves into the stooker.

Having described the principal parts involved in my invention I will briefly describe the operation of the same.

The sheaves are fed from the binder over the binder deck in the usual manner and thrown by the discharge fingers 4 through the main frame 10 to between the tines 175 and 128. It will be understood, of course, that the shaft 26 is continuously driven from the driving mechanism of the binder and during the feeding of the sheaves to and between the tines 175 and 128 the operator depresses the portion of the foot lever 139 adjacent to the seat so as to revolve the shafts 184 in the direction indicated by arrow (see Fig. 2) and thereby carrying the arm 52 in the direction indicated by arrow (see Fig. 3) thereby forcing the shoulder 54ˣ against the outer face of the disk 48, forcing such disk longitudinally upon the shaft 26 against the pressure of the spring 49ˣ to carry the faces of the clutch members 48² and 47ˣ into engagement. By this means a driving connection is formed between the shaft 26 and the disk 48. The disk then starts to revolve pulling upon the pitman 58 and thereby rocking the shaft 56 in the direction of arrow (see Fig. 3). By this means the arms 67 are carried upward in the direction of arrow (see Fig. 13) carrying the packer members formed by the triangular member 63 and double arms 61 into the position shown by dotted lines in Fig. 13 and against the fed sheaves so as to force them completely into the required position between the tines 128 and 175. This operation is accomplished during the first half revolution of the disk 48. During the rest of the revolution of the disk the pitman 58 is carried in the reverse direction so that the packer mechanisms are carried from the position shown by dotted lines in Fig. 13 back to the full or normal position. Upon the completion of the revolution of the disk 48 the notch 49 is carried opposite the shoulder 54ˣ and the pressure of the foot upon the foot lever 189 carries such shoulder through the notch and simultaneously the pressure of the spring 49 carries the disk 48 in the reverse direction to separate the faces of the clutch members 48² and 47ˣ thereby throwing the packing mechanism out of operation.

Simultaneously by the above described longitudinal movement of the rod 54 the gear pinion 33 is carried into engagement with the gear 24. By the previously described movement of the rocking rod 50 the links 75 are carried upward by the arms 71 so that the lower ends of the slot 76 are brought into contact with the bolt 77. By the further rocking movement of the rod 50 occurring simultaneously with the passage of the shoulder 54ˣ through the notch 49 the links 75 are given a further upward movement thereby tilting the bell crank 74 on its pivot and forcing the sliding member 94 longitudinally in the direction of arrow (see Fig. 3) to carry the inclined portion 96 thereof past the shoulder 88 thereby freeing the swinging member 86 which is swung upwardly by the compression spring 90 carrying the roller 91 from beneath the horizontal upper extension 18 of the swinging frame thereby allowing such portion of the tilting frame to drop from the position shown in full lines in Fig. 9 to the position shown by dotted lines, such portion of the tilting frame being forced down against the sheaves by the pressure of the spring bar 163.

Simultaneously as has been before described the bevel pinion 33 is carried into engagement with the gear 24 thereby rocating the gear in the direction of arrow (see Fig. 3) and rocking the shaft 23 in a corresponding direction. By this movement two operations are simultaneously performed, that is to say, the bar members 179ˣ and 179' are carried upward to prevent further feeding of the sheaves into the stooker and the swinging frame 13 is swung upward to carry the shock toward the delivery position.

By the rocking of the shaft 23 the bar portions 179' and 179ˣ are carried vertically upward as has been previously described and thereby form an obstruction to the further passage of sheaves.

I will now describe the operation of the delivery of a shock.

As has been before described the tilting frame is secured to the outer end of the shaft 23 and, therefore, is rocked in unison with such shaft. During the initial swinging operation the tilting frame comprising the portion 14, vertical portion 15 and horizontal portion 18 is carried in an upward circumferential movement, the loop member 116 being held in engagement with the fork 157. As the tilting frame travels up, the bar member 102, to which the loop member 116 is secured, is drawn through the slot 101 of the tilting frame thereby drawing down the corresponding end of the compressor member 99 formed by the parallel bars 99ˣ and 99′ and the cross member 99² swung upon the bolt 98 and thereby carrying such end of the compressor member toward the tines 128 to further compress the shock and into the position shown in Fig. 6. As the bar 102 is drawn to this position the dog 112 is carried over the rack 108, this operation continuing until the pressure caused by the compression of the sheaf is sufficient to overcome the tension of the spring 160. Immediately this takes place the loop member draws upon the fork 157 of the swinging member 154 to swing such member upwardly on its pivot 156 drawing the spring 160 by means of the link 159 downward into tension, the swinging member 154 assuming the position shown in Fig. 7. The shock is now compressed ready for depositing and the tilting frame 13 is carried to the substantially vertical position shown in Fig. 7. Upon the tilting frame 13 reaching this position the finger 136 engages the projection 138 so as to release the inner frame 125 in the manner hereinbefore described. Immediately the tilting frame is released by the removal of the locking dogs 132 out of the recesses 133 the member 151′ of the fork 151 engages with the projection 152 and as the swinging movement of the tilting continues the shaft 146 is rocked, the projection 152 gradually entering into the fork formed by the members 151′ and 151ˣ during the rocking movement.

By the rocking of the shaft 146 the arm 148 is swung downward so as to draw upon the link 149 and thereby pull upon the arm 139′ of the lever 139 and thereby forcing the opposite end of the lever 139ˣ upward thereby forcing the stem 143 through the orifice 142 of the swivel lug 140 against the pressure of the spring 150 thereby rocking the shaft 123 in its bearing so as to carry the inner frame 127 outward from the position shown in Fig. 7 to the position shown in Fig. 8 thereby releasing the shock in the upended position depositing it upon the ground, the inner frame, when swung into the position shown in Fig. 8, carrying the lower tines 128 out of the path of the deposited shock and thereby allowing the machine to pass.

By the completion of this operation the cam 25 carried by the gear wheel 24 engages with the stationary cam 45 forcing the bracket member 37 longitudinally in the direction of arrow (see Fig. 5) so as to carry the bevel gear 33 out of engagement with the bevel gear 24 thereby stopping the operation of the machine.

In order to carry the parts back to their normal position the operator presses upon the forward portion of the foot lever 189 thereby reversing the movement of the shafts 184 and 181 thereby rocking the shaft 50 in the reverse direction and carrying the vertical arm of the bell crank 74 back toward the vertical portion 10′ of the main frame and thereby drawing the inclined portion 96 of the locking member 94 into engagement with the shoulder 87 so as to swing the member 86 downward against the pressure of the spring 90 carrying the roller 91 back to its normal position.

It will be understood that the swinging mechanism is held in close contact with the main frame by means of the roller 20 engaging with the inner edge of the arc-shaped portion of the frame and that, therefore, when the tilting frame is in the vertical position shown in Fig. 8 the normally lower edge of the horizontal extension 18 of the tilting frame is in a line with the body of the roller and, that therefore, when the swinging motion of the tilting frame is reversed to carry the swinging frame back to the normal position the lower edge of the extension 18 engages with the roller and is carried back to its normal horizontal position against the pressure of the spring bar 163.

Simultaneously with the return movement of the locking member 94 the rod 54 is carried in the reverse direction thereby drawing the movable bracket 37 also in the reverse direction to carry the bevel pinion 32 into engagement with the bevel gear 24. The shaft 23 is then rocked in the reverse direction carrying the arm 176 downward and, therefore, carrying the bar members 179ˣ and 179′ downward below the level of the deck extension 190 and thereby leaving a free unobstructed passage for the sheaves between the tines 175 and 128.

As the swinging motion of the tilting frame is reversed by means of the reverse motion of the shaft 23 the member 151ˣ engages with the projection 152 thereby rocking the fork member 151 in the reverse direction carrying the arm 148 upward and thereby swinging the lever 139 in the reverse direction to carry the inner frame 125 back to its normal position, the inner frame being finally forced to its position by the compression of the spring 150 against the member 139ˣ of the lever 139. As the inner frame is forced into its final position by the spring 150 the recessed portions 133 are carried into engagement with the dogs 132, which yield allowing the recessed portions to pass into such position to again allow of the dog's reengaging. Also during the return movement of the tilting frame the loop member 116 engages with the lower member of the fork 154 thereby swinging it downward to the horizontal position. Immediately it is brought to this horizontal position the finger 171 of the cam 169 engages the detent 173 thereby turning the cam so that the major radius thereof engages with the finger 170 of the dog 112 forcing the dog out of engagement with the rack 108 and thereby freeing the bar 102, which is carried vertically upward as the tilting frame assumes its final position against the stop projection X carrying the compressor member 99 back to its normal position.

What I claim as my invention is:

1. In a stooking attachment for binders, the combination with a supporting frame carried by the binder, a vertical frame carried by the supporting frame and set parallel with the lower edge of the discharge deck, a rocking shaft journaled in the supporting frame, a sheaf receiver set at right angles to and carried by the outer end of the rod, a driving shaft set at right angles to the opposite end of the rocking shaft, gear connections between the driving shaft and the rocking shaft, means for alternately throwing such gear connections into engagement, means for automatically throwing the gears out of engagement at the end of each rocking movement of the rocking shaft, swingably packing members carried by the vertically set frame, operating mechanism interposed between the packing members and the driving shaft, a clutch mechanism for connecting the operating mechanism of the packing members to the driving shaft, an operating lever, and means operated by the lever when depressed for first throwing the clutch mechanism of the packing mechanism into engagement with the driving shaft for automatically releasing such clutch mechanism and simultaneously carrying the driving gear between the driving shaft and rocking shaft into engagement.

2. In a stooking attachment for binders, a supporting frame, a rocking shaft journaled in the frame, a sheaf receiver set at right angles and carried at one end of the rocking shaft, a main gear secured at the opposite end, a driving shaft, pinions mounted upon the driving shaft at each side of the main gear, swingable packing arms co-acting to force the final sheaf into the receiver, a supplemental rocking shaft, means operated by the rocking of the shaft for swinging the packing arms alternately upward and downward, a disk carried by the driving shaft, a clutch mechanism connecting the disk with the driving shaft, a crank arm carried by the supplemental rocking shaft, a pitman connecting the disk with such crank arm, a longitudinally movable member designed to carry the bevel pinions into and out of engagement with the main gear and having a portion adapted to engage the outer face of the disk when moved longitudinally to force the clutch members into engagement.

3. In a stooking attachment for binders, a supporting frame, a rocking shaft journaled in the frame, a sheaf receiver set at right angles and carried at one end of the rocking shaft, a main gear secured at the opposite end, a driving shaft, pinions mounted upon the driving shaft at each side of the main gear, swingable packing arms co-acting to force the final sheaf into the receiver, a supplemental rocking shaft, means operated by the rocking of the shaft for swinging the packing arms alternately upward and downward, a disk carried by the driving shaft having a pivotal notch therein, clutch mechanism connecting the disk with the driving shaft, a crank arm carried by the supplemental rocking shaft, a pitman connecting the disk with such crank arm, a longitudinally movable member designed to carry the bevel pinions into and out of engagement with the main gear and having a portion adapted to engage the outer face of the disk when moved longitudinally to force the clutch members into engagement and adapted to pass through the peripheral notch of the disk at the end of one revolution of the disk.

4. In a stooking attachment for binders, a vertically set open frame, a sheaf receiver comprising upper and lower parallel horizontal members located at the outside of the frame and packing mechanism comprising a swingable arm carried by the bottom of the open frame, a substantially triangular member pivotally mounted at its apex to the end of the swingable arm so that one side of such triangle extends parallel with the arm and the other sides depend, a rocking shaft journaled in suitable bearings, a crank arm carried by the rocking shaft, and an arm also carried by the rocking shaft and having a curved lower end extending around the depending members of the triangular member and having a forked end pivotally connected to the depending portion of the triangular member, and means for rocking the shaft.

5. In a stooking attachment for binders, an open frame through which the sheaves are designed to be fed, a sheaf receiver comprising upper and lower parallel members between which the sheaves are fed, a hinged support for the outer end of the upper member and a withdrawable support for the inner end, spring pressed means for forcing the inner supported end of the upper sheaf receiving member downward when the supporting means is withdrawn, and means for swinging the parallel sheaf receiving members from a horizontal to a vertical position.

6. In a stooking attachment for binders, an open frame through which the sheaves are designed to be fed, a sheaf receiver comprising upper and lower parallel members between which the sheaves are fed, a hinged support for the outer end of the upper member and a withdrawable support for the inner end, spring pressed means for forcing the inner supported end of the upper sheaf receiving member downward when the supporting means is withdrawn, means for then swinging the parallel sheaf receiving members from a horizontal to a vertical position, a compressor member swingably carried at one end in proximity to the inner end of the upper sheaf receiving member, and means for holding the opposite end of the compressor member stationary during the upward swinging movement of the sheaf receiving members.

7. In a stooking attachment for binders, an open frame through which the sheaves are designed to be fed, a sheaf receiver comprising upper and lower parallel members between which the sheaves are fed, a hinged support for the outer end of the upper member and a withdrawable support for the inner end, spring pressed means for forcing the inner supported end of the upper sheaf receiving member downward when the supporting means is withdrawn, means for then swinging the parallel sheaf receiving members from a horizontal to a vertical position, a compressor member swingably carried at one end in proximity to the inner end of the upper sheaf receiving member, means for holding the opposite end of the compressor member stationary during the upward swinging movement of the sheaf receiver members, and means for locking the compressor member in the compressing position during the depositing of the shock, and means for releasing such compressor means during the return movement of the sheaf receiver to the normal position.

8. In a stooking attachment for binders, the combination with the open frame through which sheaves are designed to be fed, a pair of parallel members forming a sheaf receiver located to the outside of the open frame and between which the sheaves are designed to be fed, means for swinging the sheaf receiving member from a horizontal position to a vertical position, opposing tines carried by the upper and lower sheaf receiving members, means for compressing the stock within the receiver as the receiver is carried to the vertical position, and means, when the lower sheaf receiving member is carried to the vertical position, for swinging the tines of the lower member from a position extending substantially at right angles to the open frame to a position extending parallel to the open frame.

9. In a stooking attachment for binders, an open frame through which sheaves are designed to be fed, an arc-shaped extension to the open frame, a sheaf receiver swingably mounted on the open frame concentrically with the center of the arc-shaped extension and comprising a lower horizontal member having a vertical extension at one end, an upper horizontal member hingedly connected to the upper end of the vertical extension, tines carried by the upper and lower members, a bracket carried by the vertical extension, a roller journaled in such bracket and bearing against the opposite side of the arc-shaped extension, withdrawable means for supporting the free end of the upper sheaf receiving member, spring pressure means bearing against such upper sheaf receiving member, and means for swinging the sheaf receiving members from a horizontal to a vertical position, and means for then releasing the sheaves.

10. In a stooking attachment for binders, an open frame through which sheaves are designed to be fed, an arc-shaped extension to the open frame, a sheaf receiver swingably mounted on the open frame concentrically with the center of the arc-shaped extension and comprising a lower horizontal member having a vertical extension at one end, an upper horizontal member hingedly connected to the upper end of the vertical extension, tines carried by the upper and lower members, a bracket carried by the vertical extension, a roller journaled in such bracket and bearing against the opposite side of the arc-shaped extension, a horizontal bar supported by the open frame, a swingable member mounted on the horizontal bar to swing at right angles thereto, a roller carried by the outer face of the swingable member and on which the free end of the upper sheaf receiving member normally rests, and withdrawable means for holding the swingable member in its normal position and for carrying such member back to its normal position after its release.

11. In a stooking attachment for binders, an open frame through which sheaves are designed to be fed, an arc-shaped extension to the open frame, a sheaf receiver swingably mounted on the open frame concentrically with the center of the arc-shaped extension and comprising a lower horizontal member having a vertical extension at one end, an upper horizontal member hingedly connected to the upper end of the vertical extension, tines carried by the upper and lower members, a bracket carried by the vertical extension, a roller journaled in such bracket and bearing against the opposite side of the arc-shaped extension, a horizontal bar supported by the open frame, a bracket carried by such horizontal bar, a swingable member carried within the bracket carrying a roller on one side upon which the free end of the upper sheaf receiving member rests, a shoulder formed at the opposite side of the swingable member, spring means normally forcing the swingable member inwardly, and withdrawable means engaging the shoulder of the swingable member for holding the swingable member in its normal position against spring pressed means.

12. In a stooking attachment for binders, an open frame through which sheaves are designed to be fed, an arc-shaped extension to the open frame, a sheaf receiver swingably mounted on the open frame concentrically with the center of the arc-shaped extension and comprising a lower horizontal member having a vertical extension at one end, an upper horizontal member hingedly connected to the upper end of the vertical extension, tines carried by the upper and lower members, a bracket carried by the vertical extension, a roller journaled in such bracket and bearing against the opposite side of the arc-shaped extension, a horizontal bar supported by the open frame, a bracket carried by such horizontal bar, a swingable member carried within the bracket carrying a roller on one side upon which the free end of the upper sheaf receiving member rests, a shoulder formed at the opposite side of the swingable member, spring means normally forcing the swingable member inwardly, a bar member slidably held in the aforesaid bracket and bearing at its lower end against the shoulder of the swingable member and having an upward inclined lower edge at its outer end, and means operated from the driver's seat for moving such slidable member longitudinally.

THOMAS JAMES CAMPBELL.

Witnesses:
A. BENSON,
A. D. CAMPBELL.

Copies of this patent may be obtained for five cents each, by addressing the "Commissioner of Patents, Washington, D. C."